United States Patent
McGinnis et al.

(10) Patent No.: US 11,090,845 B1
(45) Date of Patent: Aug. 17, 2021

(54) MANUFACTURING SYSTEM FOR EXPANDABLE AERIAL VEHICLE COMPONENTS

(71) Applicant: Amazon Technologies, Inc., Seattle, WA (US)

(72) Inventors: Steven McGinnis, Seattle, WA (US); Adrian Timothy Wallace, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 638 days.

(21) Appl. No.: 15/948,261

(22) Filed: Apr. 9, 2018

(51) Int. Cl.
*B29C 44/18* (2006.01)
*B29C 44/34* (2006.01)
*B29C 44/12* (2006.01)
*B29C 44/60* (2006.01)
*B29K 105/04* (2006.01)
(Continued)

(52) U.S. Cl.
CPC ........ *B29C 44/181* (2013.01); *B29C 44/1204* (2013.01); *B29C 44/129* (2013.01); *B29C 44/348* (2013.01); *B29C 44/3415* (2013.01); *B29C 44/60* (2013.01); *B29K 2105/048* (2013.01); *B29K 2707/04* (2013.01); *B29K 2715/006* (2013.01); *B29L 2031/3082* (2013.01); *B29L 2031/3085* (2013.01)

(58) Field of Classification Search
CPC . B29C 44/181; B29C 44/182; B29C 44/1204; B29C 44/129; B29C 44/3415; B29C 44/348; B29C 44/60; B29C 33/0016; B29C 43/12; B29C 43/3642; B29C 43/3647; B29C 51/28; B29C 2043/3649; B29C 44/183; B29C 49/44; B29C 66/81455; B29C 67/0037; B29C 33/3821; B29C 67/247; B29C 73/32; B29C 66/81459; B29C 63/16; B29C 63/182; B29C 63/28; B29D 30/0601; B30B 5/02; B30B 9/22

See application file for complete search history.

(56) References Cited

U.S. PATENT DOCUMENTS

| | | | |
|---|---|---|---|
| 4,292,101 A * | 9/1981 | Reichert | B29D 24/004 156/156 |
| 6,638,466 B1 | 10/2003 | Abbott | |
| 2013/0274037 A1 | 10/2013 | Sheng | |

OTHER PUBLICATIONS

English abstract of CN102806668A (Year: 2013).

* cited by examiner

*Primary Examiner* — Stella K Yi
(74) *Attorney, Agent, or Firm* — Athorus, PLLC

(57) ABSTRACT

Manufacturing systems for expandable components may include a controller, a heat and/or pressure source, and a transfer line. For example, the expandable components may be configured to transform from a compressed configuration to an expanded configuration upon application of heat and/or pressure. In addition, the controller may activate the heat and/or pressure source to release heat and/or gases that are directed to the expandable components via the transfer line. Further, the manufacturing system may also include an igniter, a manifold, and a valve to further control the release of heat and/or gases. Moreover, at least a portion of the heat and/or gases may be recaptured in a closed chamber and redirected to additional expandable components in other closed chambers. Furthermore, various post-processing may be performed on the components in their expanded configurations.

15 Claims, 8 Drawing Sheets

(51) Int. Cl.
*B29L 31/30* (2006.01)
*B29K 707/04* (2006.01)

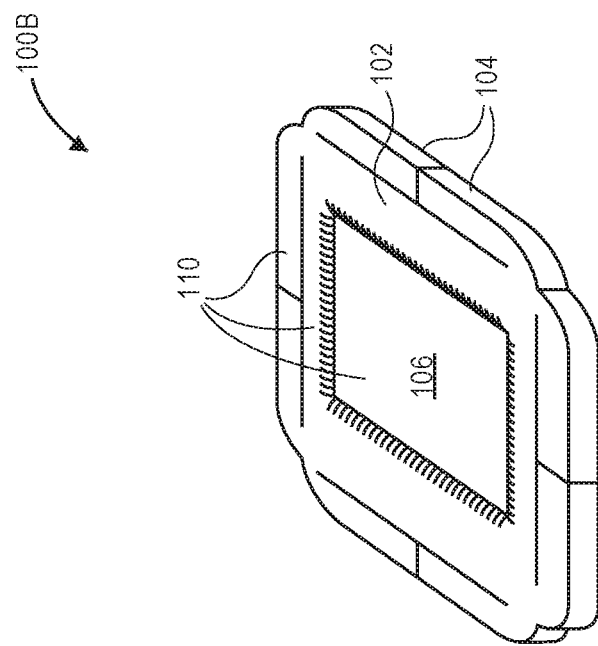
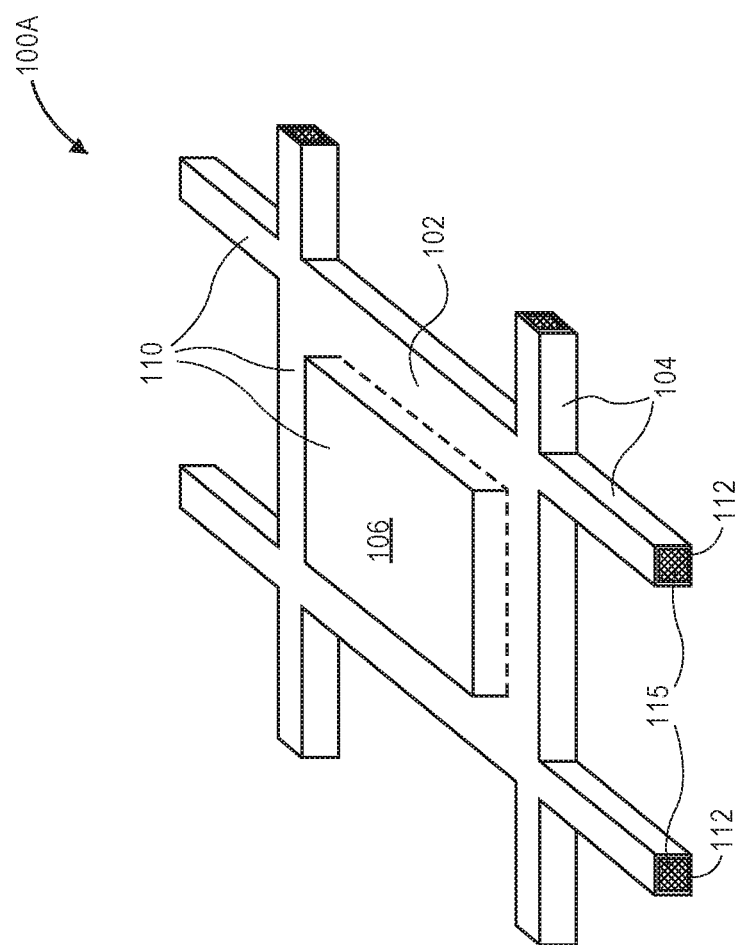
FIG. 1B
FIG. 1A

MANUFACTURING SYSTEM FOR EXPANDABLE AERIAL VEHICLE COMPONENTS

BACKGROUND

Aerial vehicles, such as unmanned aerial vehicles or automated aerial vehicles, may be manufactured or formed from various components. Each of the components may be made of different materials such as metals or plastics. The manufacture and assembly of all components to form an aerial vehicle can be a manual, time-consuming, and expensive process. Accordingly, there is a need to manufacture or form aerial vehicles efficiently and cost-effectively in an automated manner.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 1A is a schematic diagram of an example expandable aerial vehicle frame in an expanded configuration, according to an implementation.

FIG. 1B is a schematic diagram of the example expandable aerial vehicle frame in a compressed configuration, according to an implementation.

Figure 2B:
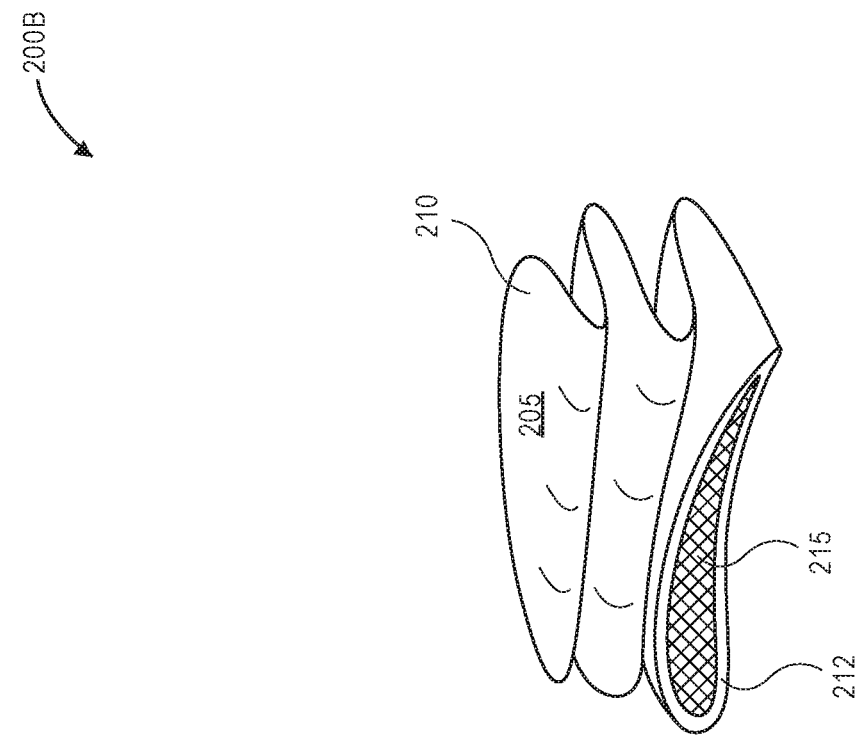
FIG. 2B is a schematic diagram of the example expandable aerial vehicle component in a compressed configuration, according to an implementation.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Systems and methods to fabricate expandable components, such as aerial vehicles, frames, or components thereof, are described herein. In addition, systems and methods to expand and cure expandable components, such as aerial vehicles, frames, or components thereof, are described herein.

The expandable components may include aerial vehicle frames, fuselages, wings, control surfaces, motor arms, panels, beams, tubes, or any other components, including components other than those associated with aerial vehicles. For example, the expandable components may be structural beams, tubes or pipes, walls or other surfaces, or any other components included in various types of vehicles, structures, buildings, machines, products, or any other apparatuses or systems.

The expandable components may include an outer structure, such as a carbon fiber, fiberglass, fiberglass cloth, or Kevlar structure, formed in a desired shape or size. In example embodiments, the outer structure may expand and cure to the desired shape or size upon application of heat and/or pressure. In addition, the expandable components may include an adhesive bladder within the outer structure. In example embodiments, a shape or size of the adhesive bladder may be formed based on the shape or size of the outer structure, and an exterior surface of the adhesive bladder may expand, bond to, and cure together with the outer structure upon application of heat and/or pressure. Further, the expandable components may include an expanding foam material within the adhesive bladder. In example embodiments, the expanding foam material may expand and cure within the adhesive bladder upon application of heat and/or pressure.

Prior to application of heat and/or pressure, the expandable components may be folded, rolled, compressed, or otherwise reduced in shape or size for storage, transport, handling, or other processes. In this manner, the expandable components may be fabricated and stored in a compressed configuration, and when the expandable components are needed, they may be retrieved from storage and/or transported to a location for use, and then expanded and cured for use in an expanded configuration.

In example embodiments, the expandable components may be expanded via various manufacturing systems. For example, the manufacturing systems may include a controller, an igniter, a heat and/or pressure source such as a sodium azide initiator, a manifold, one or more valves, and/or one or more transfer lines. The one or more transfer lines may be connected to one or more transfer points of an adhesive bladder of an expandable component, such that responsive to transfer of heat and/or pressure via the transfer lines, the expanding foam material within the adhesive bladder may expand and cure. Then, the adhesive bladder may also expand, as well as bond to and cure together with the outer structure. Further, the outer structure may also expand and cure to the desired shape or size.

In additional example embodiments, the manufacturing systems may also include closed chambers within which the expandable components are expanded and cured. For example, the closed chambers may include an additional manifold, one or more valves, and/or one or more transfer lines. In this manner, heat and/or pressure, or at least a portion thereof, used to expand and cure a first expandable component within a first closed chamber may be recaptured and transferred to a second closed chamber to expand and cure a second expandable component disposed therein.

After application of heat and/or pressure to modify an expandable component from a compressed configuration to an expanded configuration, various other processing may be performed on the expandable component. For example, the expanding foam material may be removed, e.g., via chemical means, to create a hollow, expandable component. In addition, various other structures, components, or elements may be added to the expandable component. In example embodiments in which the expandable component is associated with an aerial vehicle, various motors, propellers, power supplies, controllers, avionics, sensors, payloads, or other components or elements may be added to the expandable component. Further, various testing of the expandable component may be performed. In example embodiments in which the expandable component is associated with an aerial vehicle, various structural, validation, reliability, pre-flight, test flight, or other testing may be performed.

FIG. 1A is a schematic diagram of an example expandable aerial vehicle frame in an expanded configuration 100A, according to an implementation.

The expandable component shown in FIG. 1A includes an aerial vehicle frame 102, one or more motor arms 104, and a fuselage 106 in an expanded configuration. In example embodiments, the frame 102 may be a substantially rectangular shape and provide structural support to the one or more motor arms 104 and/or the fuselage 106. In other example embodiments, the frame 102 may have a different shape or size, such as a circular, elliptical, hexagonal, octagonal, other polygonal, or other shape or size.

In example embodiments, the motor arms 104 may extend radially outward from the frame 102. As shown in FIG. 1A, eight motor arms 104 may extend around the frame 102 to support eight propulsion mechanisms in an octocopter configuration. In other example embodiments, a different number of motor arms 104, such as three, four, five, six, or any other number of motor arms, may extend around or be placed on the frame 102 at various locations and/or in various other configurations.

In example embodiments, the fuselage 106 may be formed in a central portion of the frame 102. As shown in FIG. 1A, the fuselage 106 may be a substantially rectangular shape and provide one or more locations for other components or elements to be added, attached, or inserted into the expandable aerial vehicle frame, such as power supplies, controllers, avionics, sensors, payloads, or other elements. In other example embodiments, the fuselage 106 may have a different shape, size, or location relative to the frame 102, such as circular, elliptical, hexagonal, octagonal, other polygonal, or other shape or size, and/or the fuselage 106 may be separated into two or more sections or portions at various locations on the frame 102.

The frame 102, the one or more motor arms 104, and the fuselage 106 may include an outer structure 110. In example embodiments, the outer structure 110 may be formed of various materials, including carbon fiber, fiberglass, fiberglass cloth, Kevlar, or other similar materials that have near-zero stretch and that can be transformed between a compressed configuration and an expanded configuration. Further, the outer structure 110 may comprise three-dimensional preformed or knitted structures or socks having a desired shape or size.

For example embodiments in which the outer structure 110 is formed of carbon fiber, the carbon fiber may or may not be pre-impregnated with resin to facilitate curing of the carbon fiber structure. Pre-impregnated carbon fiber may be cured by application of heat and/or pressure without the addition of further resin or other curing materials or compounds.

The frame 102, the one or more motor arms 104, and the fuselage 106 may also include an adhesive bladder 112. In example embodiments, the adhesive bladder 112 may be formed of various adhesive materials, such as film adhesives, glue sheets, other types of adhesive materials, or combinations thereof that can be transformed between a compressed configuration and an expanded configuration. The adhesive materials of the adhesive bladder 112 may be relatively not sticky or tacky at room temperatures, working temperatures, and/or colder temperatures. However, upon application of heat and/or pressure, the adhesive materials of the adhesive bladder 112 may become substantially sticky or tacky so as to adhere or bond to the outer structure 110. In addition, the adhesive bladder 112 may be formed in a shape or size associated with the desired shape or size of the associated outer structure 110.

Further, the adhesive bladder 112 may be substantially impermeable to expanding foam materials contained therein. In contrast, the adhesive bladder 112 may be permeable to gases, such that heat and/or pressure that is transferred to an interior of the adhesive bladder to expand and cure the expanding foam materials may not remain trapped within the adhesive bladder 112. In addition, the outer structure may also be permeable to gases, such that air or other gases between the outer structure and the adhesive bladder may also not remain trapped within the outer structure 110.

Moreover, the adhesive bladder 112 may include one or more transfer points (not shown) at various locations to which one or more transfer lines may be connected to transfer heat and/or pressure to an interior of the adhesive bladder 112. Furthermore, the adhesive bladder 112 may include a plurality of sections or portions (or individual bladders that together make up a composite bladder for an expandable component), and each of the plurality of sections or portions may include one or more transfer points configured to receive heat and/or pressure. As further described herein, the heat and/or pressure transferred by the one or more transfer lines may originate from various types of heat and/or pressure sources, such as sodium azide initiators or other sources.

The expanding foam materials 115 contained within the adhesive bladder 112 may be one-part, two-part, or multi-part foam materials. In example embodiments, the expanding foam materials 115 may comprise one-part foam materials that expand and cure upon application of heat and/or pressure. In other example embodiments, the expanding foam materials 115 may comprise two-part or multi-part foam materials that expand and cure upon mixing between respective parts of the foam materials and/or upon application of heat and/or pressure. For example, the two-part or multi-part foam materials may be mixed and injected or metered into the adhesive bladder 112 to initiate expansion of the adhesive bladder 112 and/or outer structure 110. In addition, the two-part or multi-part foam materials may be designed or configured to release heat as part of the expansion, which heat may further be used to bond and/or cure the adhesive bladder 112 and/or cure the outer structure 110.

In example embodiments, a defined amount of expanding foam materials 115 may be injected, inserted, or metered into the adhesive bladder 112, such that the expanding foam materials 115 may generate a desired amount of overpressure to expand and cure within the adhesive bladder 112, while also expanding the adhesive bladder 112 and the outer structure 110 to the desired shape or size. Although FIG. 1A shows the expanding foam materials 115 at ends of the motor arms 104, this is shown for illustrative purposes, and the expanding foam materials 115 may not be visible outside and/or may be wholly contained within the adhesive bladder 112 and/or the outer structure 110.

FIG. 1B is a schematic diagram of the example expandable aerial vehicle frame in a compressed configuration 100B, according to an implementation.

As described herein with respect to FIG. 1A, the expandable component shown in FIG. 1B includes an aerial vehicle frame 102, one or more motor arms 104, and a fuselage 106 in a compressed configuration. Features and aspects of the frame 102, motor arms 104, fuselage 106, outer structure 110, adhesive bladder 112 (not visible in FIG. 1B), and expanding foam materials 115 (not visible in FIG. 1B) included in FIG. 1B are substantially similar to those described herein with respect to FIG. 1A In the compressed configuration of FIG. 1B, the motor arms 104 may be folded, rolled, and/or compressed toward the frame 102 in order to reduce an overall size, shape, and/or volume of the expandable component. In addition, the fuselage 106 may also be folded, rolled, and/or compressed inward or toward the frame 102 in order to also reduce an overall size, shape, and/or volume of the expandable component. Further, one or more portions of the frame 102 may also be folded, rolled, and/or compressed inward in order to further reduce an overall size, shape, and/or volume of the expandable component.

As further described herein, in the compressed configuration, the outer structure 110 may be folded, rolled, and/or compressed, and the outer structure 110 may also not yet be expanded and/or cured. In addition, the adhesive bladder 112 may not be bonded or may be only partially bonded to an interior of the outer structure 110, and the adhesive bladder 112 may also not yet be expanded and/or cured. Further, the expanding foam materials 115 within the adhesive bladder 112 may also not yet be expanded and/or cured.

In example embodiments, upon application of heat and/or pressure to an interior of the adhesive bladder 112 via one or more transfer lines and transfer points in the compressed configuration, the expandable component shown in FIG. 1B may expand to substantially the shape and size of the expanded configuration shown in FIG. 1A. For example, the expanding foam materials 115 may expand and/or cure within the adhesive bladder 112, the adhesive bladder 112 may expand within, bond to, and/or cure together with the outer structure 110, and the outer structure 110 may expand and/or cure to the desired shape or size of the expanded configuration.

Figure 2A:
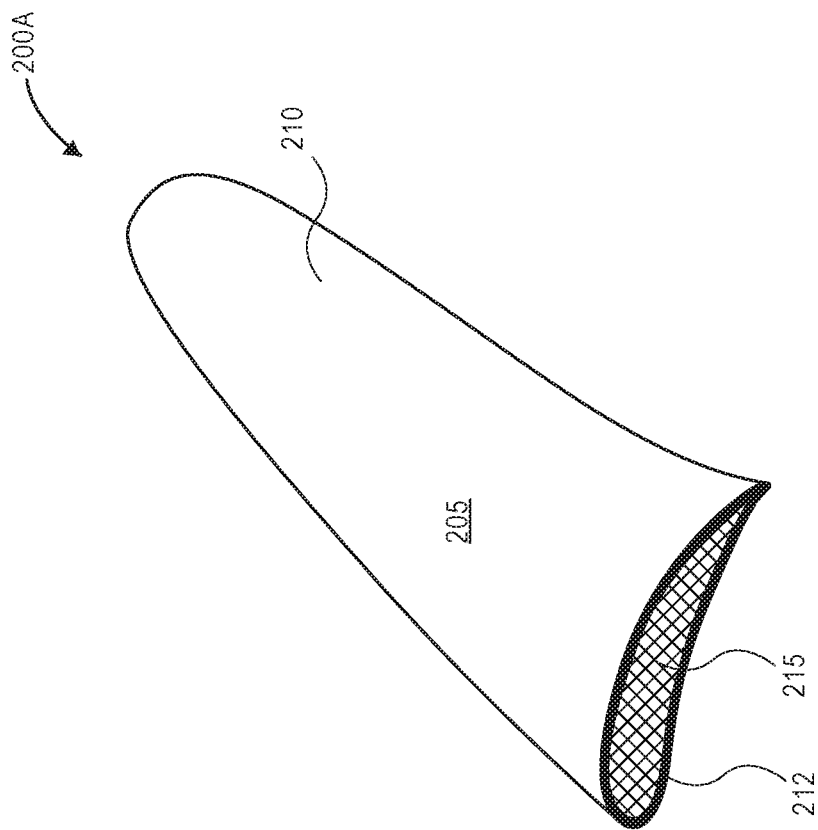
FIG. 2A is a schematic diagram of an example expandable aerial vehicle component in an expanded configuration, according to an implementation.

FIG. 2A is a schematic diagram of an example expandable aerial vehicle component in an expanded configuration 200A, according to an implementation.

The expandable component shown in FIG. 2A includes an aerial vehicle wing 205 in an expanded configuration. In example embodiments, the wing 205 may be a substantially airfoil shape or other aerodynamic shape to provide lift to an aerial vehicle to which the wing 205 is attached or forms a part. In other example embodiments, the wing 205 may have a different shape, size, length, and/or aerodynamic profile. Further, although a wing 205 is shown in FIG. 2A, the expandable component may comprise any other type of aerial vehicle component, such as a fuselage, a control surface, a motor arm, a panel, a beam, or a tube, or any other type of component for a different machine, system, apparatus, or device.

The wing 205 may include an outer structure 210. In example embodiments, the outer structure 210 may be formed of various materials, including carbon fiber, fiberglass, fiberglass cloth, Kevlar, or other similar materials that have near-zero stretch and that can be transformed between a compressed configuration and an expanded configuration. Further, the outer structure 210 may comprise three-dimensional preformed or knitted structures or socks having a desired shape or size.

For example embodiments in which the outer structure 210 is formed of carbon fiber, the carbon fiber may or may not be pre-impregnated with resin to facilitate curing of the carbon fiber structure. Pre-impregnated carbon fiber may be cured by application of heat and/or pressure without the addition of further resin or other curing materials or compounds.

The wing 205 may also include an adhesive bladder 212. In example embodiments, the adhesive bladder 212 may be formed of various adhesive materials, such as film adhesives, glue sheets, other types of adhesive materials, or combinations thereof that can be transformed between a compressed configuration and an expanded configuration. The adhesive materials of the adhesive bladder 212 may be relatively not sticky or tacky at room temperatures, working temperatures, and/or colder temperatures. However, upon application of heat and/or pressure, the adhesive materials of the adhesive bladder 212 may become substantially sticky or tacky so as to adhere or bond to the outer structure 210. In addition, the adhesive bladder 212 may be formed in a shape or size associated with the desired shape or size of the associated outer structure 210.

Further, the adhesive bladder 212 may be substantially impermeable to expanding foam materials contained therein. In contrast, the adhesive bladder 212 may be permeable to gases, such that heat and/or pressure that is transferred to an interior of the adhesive bladder to expand and cure the expanding foam materials may not remain trapped within the adhesive bladder 212. In addition, the outer structure may also be permeable to gases, such that air or other gases between the outer structure and the adhesive bladder may also not remain trapped within the outer structure 210.

Moreover, the adhesive bladder 212 may include one or more transfer points (not shown) at various locations to which one or more transfer lines may be connected to transfer heat and/or pressure to an interior of the adhesive bladder 212. Furthermore, the adhesive bladder 212 may include a plurality of sections or portions (or individual bladders that together make up a composite bladder for an expandable component), and each of the plurality of sections or portions may include one or more transfer points configured to receive heat and/or pressure. As further described herein, the heat and/or pressure transferred by the one or more transfer lines may originate from various types of heat and/or pressure sources, such as sodium azide initiators or other sources.

The expanding foam materials 215 contained within the adhesive bladder 212 may be one-part, two-part, or multi-part foam materials. In example embodiments, the expanding foam materials 215 may comprise one-part foam materials that expand and cure upon application of heat and/or pressure. In other example embodiments, the expanding foam materials 215 may comprise two-part or multi-part foam materials that expand and cure upon mixing between respective parts of the foam materials and/or upon application of heat and/or pressure. For example, the two-part or multi-part foam materials may be mixed and injected or metered into the adhesive bladder 212 to initiate expansion of the adhesive bladder 212 and/or outer structure 210. In addition, the two-part or multi-part foam materials may be designed or configured to release heat as part of the expansion, which heat may further be used to bond and/or cure the adhesive bladder 212 and/or cure the outer structure 210.

In example embodiments, a defined amount of expanding foam materials 215 may be injected, inserted, or metered into the adhesive bladder 212, such that the expanding foam materials 215 may generate a desired amount of overpressure to expand and cure within the adhesive bladder 212, while also expanding the adhesive bladder 212 and the outer structure 210 to the desired shape or size. Although FIG. 2A shows the expanding foam materials 215 at an end of the wing 205, this is shown for illustrative purposes, and the expanding foam materials 215 may not be visible outside and/or may be wholly contained within the adhesive bladder 212 and/or the outer structure 210.

FIG. 2B is a schematic diagram of the example expandable aerial vehicle component in a compressed configuration 200B, according to an implementation.

As described herein with respect to FIG. 2A, the expandable component shown in FIG. 2B includes a wing 205 in a compressed configuration. Features and aspects of the wing 205, outer structure 210, adhesive bladder 212, and expanding foam materials 215 included in FIG. 2B are substantially similar to those described herein with respect to FIG. 2A.

In the compressed configuration of FIG. 2B, the wing 205 may be folded, rolled, and/or compressed inward or toward portions of itself in order to reduce an overall size, shape, and/or volume of the expandable component.

As further described herein, in the compressed configuration, the outer structure 210 may be folded, rolled, and/or compressed, and the outer structure 210 may also not yet be expanded and/or cured. In addition, the adhesive bladder 212 may not be bonded or may be only partially bonded to an interior of the outer structure 210, and the adhesive bladder 212 may also not yet be expanded and/or cured. Further, the expanding foam materials 215 within the adhesive bladder 212 may also not yet be expanded and/or cured.

In example embodiments, upon application of heat and/or pressure to an interior of the adhesive bladder 212 via one or more transfer lines and transfer points in the compressed configuration, the expandable component shown in FIG. 2B may expand to substantially the shape and size of the expanded configuration shown in FIG. 2A. For example, the expanding foam materials 215 may expand and/or cure within the adhesive bladder 212, the adhesive bladder 212 may expand within, bond to, and/or cure together with the outer structure 210, and the outer structure 210 may expand and/or cure to the desired shape or size of the expanded configuration.

Figure 3A:
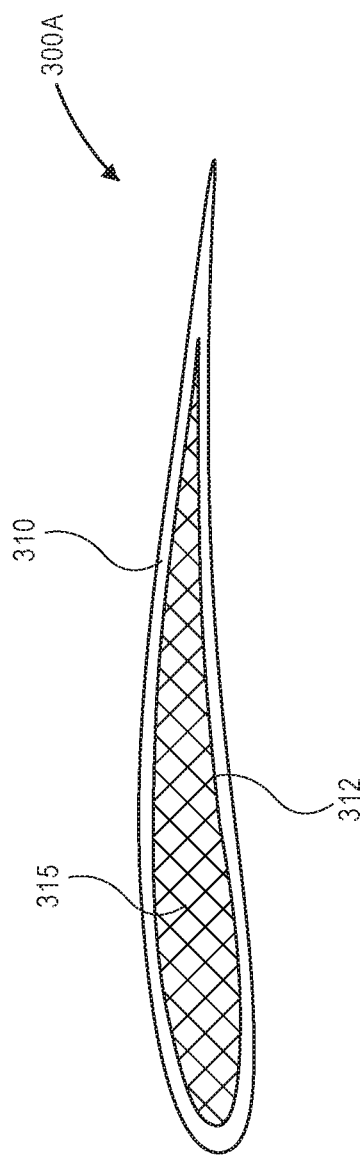
FIG. 3A is a schematic, cross-sectional diagram of an example expandable aerial vehicle component in a compressed configuration, according to an implementation.

FIG. 3A is a schematic, cross-sectional diagram of an example expandable aerial vehicle component in a compressed configuration 300A, according to an implementation.

The expandable component shown in cross-section in FIG. 3A includes an aerial vehicle wing in a compressed configuration. In example embodiments, the wing may be a substantially airfoil shape or other aerodynamic shape to provide lift to an aerial vehicle to which the wing is attached. In other example embodiments, the wing may have a different cross-sectional shape, size, length, and/or aerodynamic profile. Further, although a wing is shown in cross-section in FIG. 3A, the expandable component may comprise any other type of aerial vehicle component, such as a fuselage, a control surface, a motor arm, a panel, a beam, or a tube, or any other type of component for a different machine, system, apparatus, or device.

The wing may include an outer structure 310, an adhesive bladder 312, and expanding foam materials 315. Features and aspects of the outer structure 310, the adhesive bladder 312, and the expanding foam materials 315 are substantially similar to those described herein with respect to FIGS. 1A, 1B, 2A, and 2B.

As shown in the compressed configuration cross-section in FIG. 3A, the outer structure 310 may not be expanded and/or cured to a desired shape or size of the expandable component. In addition, the adhesive bladder 312 may not be bonded or may be only partially bonded to an interior of the outer structure 310, and the adhesive bladder 312 may also not yet be expanded and/or cured. Further, the expanding foam materials 315 within the adhesive bladder 312 may also not yet be expanded and/or cured.

Figure 3B:
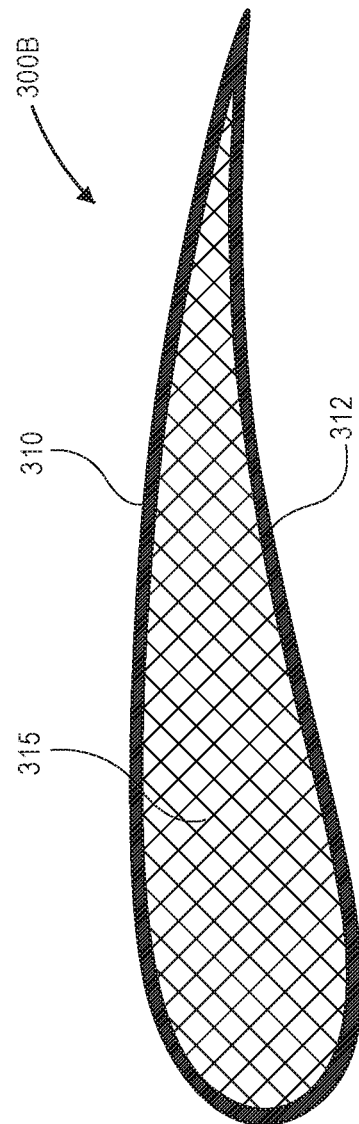
FIG. 3B is a schematic, cross-sectional diagram of the example expandable aerial vehicle component in an expanded configuration, according to an implementation.

FIG. 3B is a schematic, cross-sectional diagram of the example expandable aerial vehicle component in an expanded configuration 300B, according to an implementation.

The expandable component shown in cross-section in FIG. 3B includes an aerial vehicle wing in an expanded configuration. In example embodiments, the wing may be a substantially airfoil shape or other aerodynamic shape to provide lift to an aerial vehicle to which the wing is attached. In other example embodiments, the wing may have a different cross-sectional shape, size, length, and/or aerodynamic profile. Further, although a wing is shown in cross-section in FIG. 3B, the expandable component may comprise any other type of aerial vehicle component, such as a fuselage, a control surface, a motor arm, a panel, a beam, or a tube, or any other type of component for a different machine, system, apparatus, or device.

The wing may include an outer structure 310, an adhesive bladder 312, and expanding foam materials 315. Features and aspects of the outer structure 310, the adhesive bladder 312, and the expanding foam materials 315 are substantially similar to those described herein with respect to FIGS. 1A, 1B, 2A, and 2B.

As shown in the expanded configuration cross-section in FIG. 3B, the outer structure 310 may be expanded and/or cured to a desired shape or size of the expandable component. In addition, the adhesive bladder 312 may be bonded to an interior of the outer structure 310, and the adhesive bladder 312 may also be expanded and/or cured. Further, the expanding foam materials 315 within the adhesive bladder 312 may also be expanded and/or cured.

Figure 4:
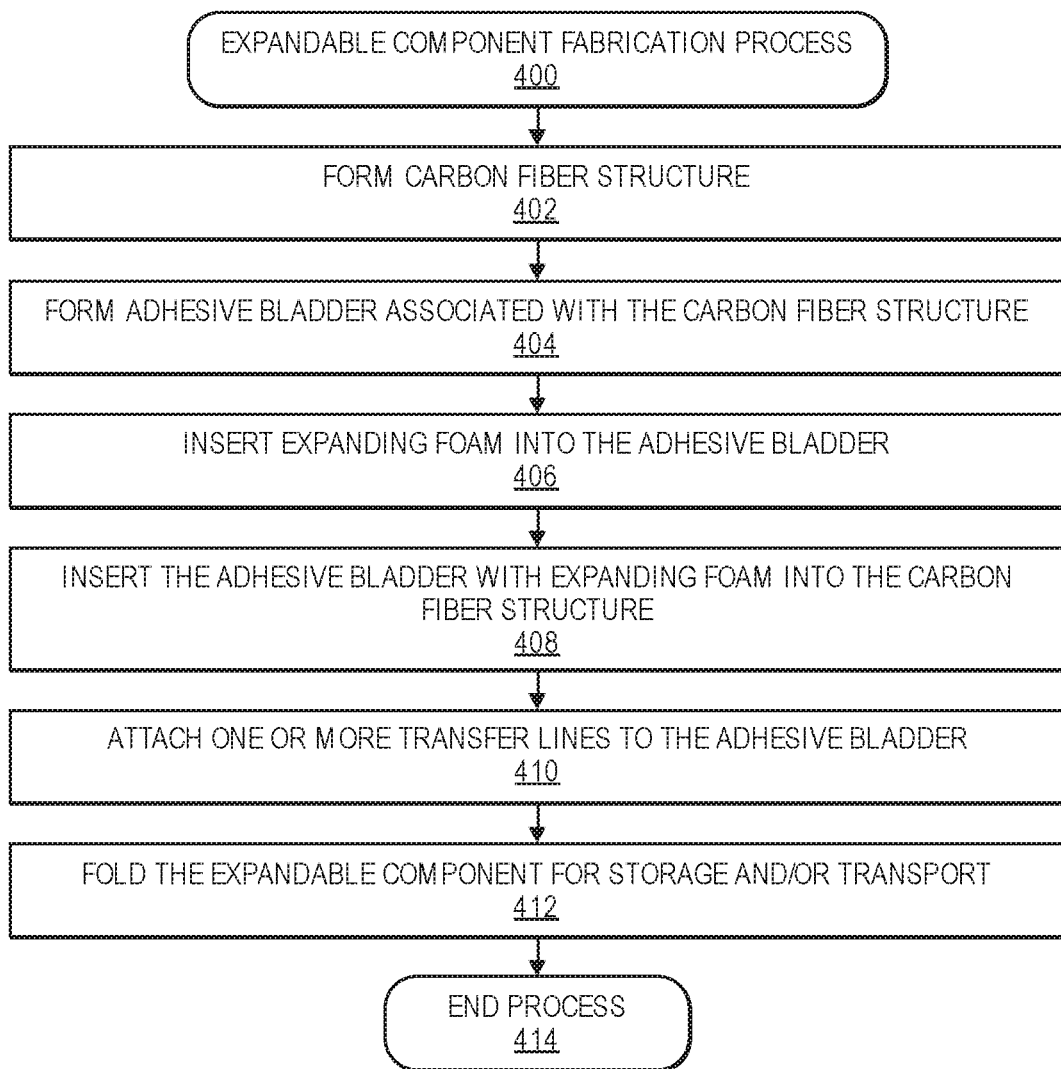
FIG. 4 is a flow diagram illustrating an example expandable component fabrication process, according to an implementation.

FIG. 4 is a flow diagram illustrating an example expandable component fabrication process 400, according to an implementation.

The process 400 may begin by forming a carbon fiber structure, as at 402. The carbon fiber structure may comprise a three-dimensional preformed or knitted structure or sock. In addition, the carbon fiber structure may be formed to transform between a compressed configuration and an expanded configuration having a desired shape or size. Further, the carbon fiber structure may have near-zero stretch so as to attain the desired shape or size upon expansion and/or curing. Moreover, the carbon fiber structure may also be permeable to gases so as not to trap gases within the carbon fiber structure upon expansion and/or curing. Example carbon fiber structures may include a component of aerial vehicles, such as a frame, a fuselage, a wing, a control surface, a motor arm, a panel, a beam, or a tube, or any other structures or components of different machines, systems, apparatuses, or devices.

The process 400 may continue to form an adhesive bladder associated with the carbon fiber structure, as at 404. The adhesive bladder may comprise a film adhesive, a glue sheet, or other adhesive materials. In addition, the adhesive bladder may be formed to transform between a compressed configuration and an expanded configuration associated with the desired shape or size of the carbon fiber structure. Further, the adhesive bladder may be impermeable to expanding foam materials contained therein, and the adhesive bladder may be permeable to gases so as not to trap gases within the adhesive bladder upon expansion and/or curing. Moreover, the adhesive bladder may be relatively not sticky or tacky at room temperatures, working temperatures, and/or colder temperatures associated with fabrication, storage, transport, and/or handling.

The process 400 may then proceed to insert expanding foam into the adhesive bladder, as at 406. The expanding foam materials may comprise one-part, two-part, or multi-part expanding foam materials. In addition, the expanding foam materials may expand and/or cure upon application of heat and/or pressure. Further, the expanding foam materials may expand and/or cure upon mixing of respective parts of the foam materials. A defined amount of expanding foam materials may be inserted, injected, and/or metered into the adhesive bladder to generate a desired amount of overpressure to expand and cure upon application of heat and/or pressure within the adhesive bladder, while also expanding the adhesive bladder and the carbon fiber structure to the desired shape or size. In alternative embodiments, rather than injecting the expanding foam into the adhesive bladder, the adhesive bladder may be formed around the expanding foam.

The process 400 may continue by inserting the adhesive bladder with the expanding foam into the carbon fiber structure, as at 408. For example, the adhesive bladder may be inserted into the carbon fiber structure so as to expand the carbon fiber structure to the desired shape or size upon application of heat and/or pressure. In addition, the adhesive bladder may not be bonded or may be only partially bonded to an interior of the carbon fiber structure during fabrication, storage, transport, and/or handling. In alternative embodiments, rather than inserting the adhesive bladder into the carbon fiber structure, the carbon fiber structure may be formed around the adhesive bladder.

The process 400 may then proceed by attaching one or more transfer lines to the adhesive bladder, as at 410. For example, one or more transfer lines may be attached to one or more transfer points on the adhesive bladder. The transfer points may allow transfer of heat and/or gases to generate pressure from the transfer lines into the adhesive bladder in order to initiate expansion and/or curing of the expanding foam materials. In example embodiments, the transfer points may comprise orifices, valves, holes, or other similar structures. Further, the transfer lines may allow transfer of heat and/or gases from one or more heat and/or pressure sources to one or more adhesive bladders or portions thereof. In example embodiments, the transfer lines may comprise tubes, pipes, hoses, or other similar structures that may be connected between one or more heat and/or pressure sources and one or more transfer points. In alternative embodiments, this step may be omitted and performed at a later stage, e.g., prior to expansion and/or curing of the expandable component.

The process 400 may then continue to fold the expandable component for storage and/or transport, as at 412. For example, the expandable component including the carbon fiber structure, adhesive bladder, and expanding foam materials may be folded, rolled, and/or compressed into a compressed configuration in order to reduce an overall size, shape, and/or volume of the expandable component. In this manner, the expandable component may be stored for later use, transported between locations at a decreased volume, and/or more easily handled in the compressed configuration. The process 400 may then end, as at 414.

Figure 5:
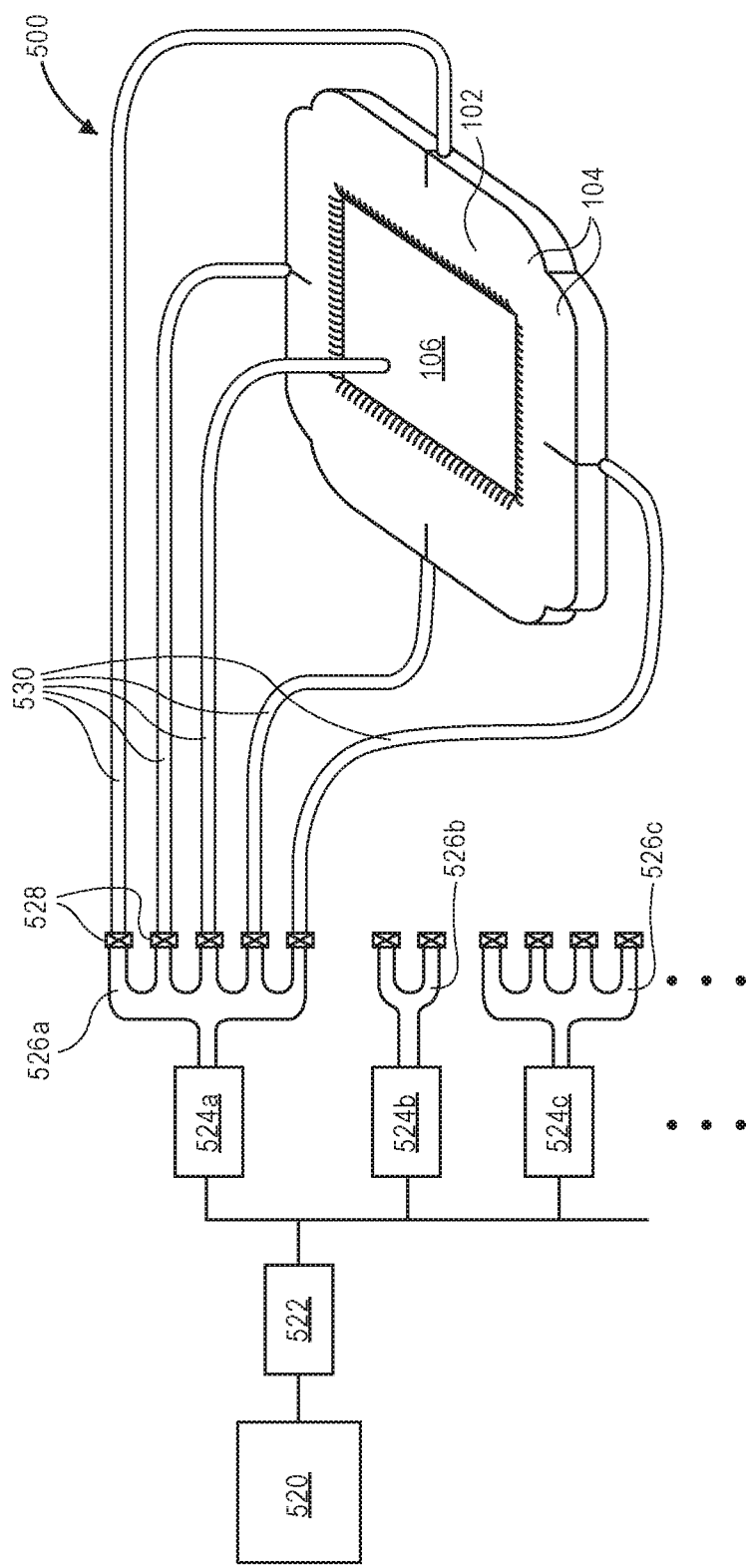
FIG. 5 is a schematic diagram of an example expandable component manufacturing system, according to an implementation.

FIG. 5 is a schematic diagram of an example expandable component manufacturing system 500, according to an implementation.

The manufacturing system 500 shown in FIG. 5 includes a controller 520, an igniter 522, one or more heat and/or pressure sources 524, one or more manifolds 526, one or more valves 528, and/or one or more transfer lines 530. The controller 520 may include one or more processors and/or memories and communicate with and/or control the operation of various components of the manufacturing system 500, as further described herein with respect to FIG. 8.

In example embodiments, the controller 520 may cause activation of the igniter 522 to initiate release of heat and/or gases from the one or more heat and/or pressure sources 524. In addition, the controller 520 may cause activation of the igniter 522 and particular heat and/or pressure sources according to a defined sequence or order to control the release of heat and/or gases to one or more expandable components or sections thereof. The igniter 522 may comprise an electrical igniter that sends an electrical signal to the heat and/or pressure sources 524 to initiate release of heat and/or gases. In addition, the igniter 522 may comprise a mechanical igniter that ignites or otherwise causes combustion or other chemical reactions at the heat and/or pressure sources 524 to initiate release of heat and/or gases. Further, the igniter 522 may comprise a chemical igniter that causes combustion or other chemical reactions at the heat and/or pressure sources 524 to initiate release of heat and/or gases. Moreover, the igniter 522 may comprise any other type of igniter that can initiate release of heat and/or gases from the heat and/or pressure sources 524. In other example embodiments, the igniter 522 may be omitted or combined with the controller 520 and/or the heat and/or pressure sources 524, and the controller 520 may directly communicate with the heat and/or pressure sources 524 to initiate release of heat and/or gases.

In example embodiments, the heat and/or pressure sources 524 may comprise sodium azide initiators, such as those used to inflate automobile airbags. For example, a sodium azide initiator may contain $NaN_3$ that breaks down upon activation and/or application of heat. Some of the products of the breakdown of $NaN_3$ may be nitrogen gas and heat, among others. A sodium azide initiator may also contain other elements or compounds to control the breakdown and/or manage the products of such breakdown. The nitrogen gas and heat may be transferred via the manifolds 526, valves 528, and/or transfer lines 530 to one or more expandable components. In other example embodiments, the heat and/or pressure sources 524 may comprise other types of initiators or sources that may use other chemical, mechanical, and/or electrical interactions and/or reactions to initiate release of heat and/or gases.

The manifolds 526 may facilitate transfer of heat and/or gases from the heat and/or pressure sources 524 to one or more expandable components via one or more outlets. The manifolds 526 may be configured in different sizes or shapes as desired. For example, a manifold 526 may transfer heat and/or gases via one outlet to an expandable component, via one outlet to a plurality of expandable components or sections thereof, via a plurality of outlets to a plurality of sections of an expandable component, and/or via a plurality of outlets to a plurality of expandable components or sections thereof. In addition, the manifolds 526 may include or be connected to one or more valves 528. The valves 528 may be controlled by the controller 520 to open or close as desired to allow transfer of heat and/or gases to one or more expandable components or sections thereof. Further, transfer lines 530 may be connected between each of the valves 528 and/or outlets of the manifolds 526 and one or more expandable components or sections thereof. The transfer lines 530 may comprise tubes, pipes, hoses, or similar structures to transfer heat and/or gases from heat and/or pressure sources 524 to expandable components.

Although FIG. 5 shows five transfer lines 530 connected to various sections of an expandable aerial vehicle component including a frame 102, motor arms 104, and a fuselage 106, any other number, combination, arrangement, and/or orientation of transfer lines may be used to connect to transfer points of one or more expandable components or sections thereof. In addition, the transfer points of one or more expandable components may be designed and/or configured with particular sizes, shapes, diameters, and/or other characteristics and at particular locations to facilitate expansion of the expandable components to the desired shapes or sizes. Further, the heat and/or pressure sources 524, manifolds 526, valves 528, and/or transfer lines 530 may also be designed and/or configured with particular sizes, shapes, diameters, lengths, and/or other characteristics to facilitate transfer of heat and/or gases to expand the expandable components to the desired shapes or sizes.

Moreover, although FIG. 5 shows the valves 528 at particular locations between manifolds 526 and transfer lines 530, any other number, placement, arrangement, and/or combination of one or more valves may be used to control transfer of heat and/or gases from heat and/or pressure sources to expandable components or sections thereof. In other example embodiments, the manifolds 526 and/or valves 528 may be omitted, and the transfer lines 530 may be connected directly between the heat and/or pressure sources 524 and the expandable components or sections thereof.

In further example embodiments, the manifolds 526, valves 528, and/or transfer lines 530 may be omitted, and the one or more sodium azide initiators or other heat and/or pressure sources may be located and activated within an expandable component, e.g., within the adhesive bladder with the expanding foam materials, such that heat and/or pressure from the sodium azide initiators is released directly to the expanding foam materials within the adhesive bladder. In such example embodiments, portions of the sodium azide initiators may remain within and become encased or enclosed inside the expanding foam materials within the adhesive bladder.

In still further example embodiments, an expandable component may be placed within a molding tool having interior surfaces corresponding to the desired shape or size of the expandable component to further ensure that the expandable component expands and cures to the desired shape or size. Moreover, the molding tool may also apply heat and/or pressure to facilitate expansion and/or curing of the outer structure, the adhesive bladder, and/or the expanding foam materials of the expandable component.

Figure 6:
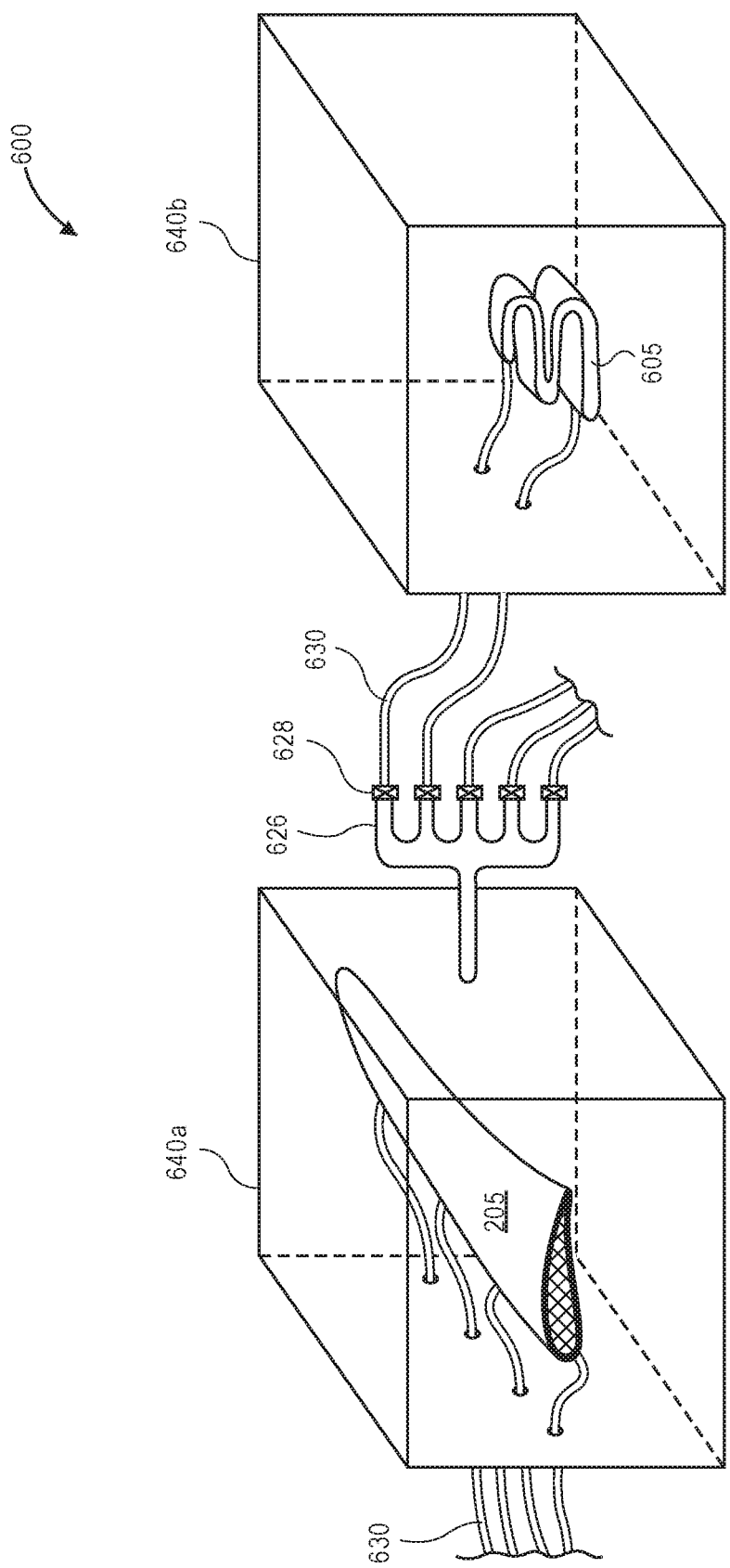
FIG. 6 is a schematic diagram of another example expandable component manufacturing system, according to an implementation.

FIG. 6 is a schematic diagram of another example expandable component manufacturing system 600, according to an implementation.

The manufacturing system 600 shown in FIG. 6 may also include a controller, an igniter, one or more heat and/or pressure sources, one or more manifolds, one or more valves, and/or one or more transfer lines 630. Features or aspects of the controller, igniter, heat and/or pressure sources, manifolds, valves, and/or transfer lines may be substantially similar to those described herein with respect to FIG. 5.

As shown in FIG. 6, a first expandable component, e.g., an aerial vehicle wing 205 (shown in a substantially expanded configuration), may be placed within a first closed chamber 640a, and one or more transfer lines 630 may be connected to one or more transfer points of the wing 205. Heat and/or gases may be transferred via the transfer lines 630 to an interior of an adhesive bladder within the wing 205, thereby causing expansion and/or curing of expanding foam materials inside the adhesive bladder, expansion, bonding, and/or curing of the adhesive bladder inside the outer structure, and/or expansion and/or curing of the outer structure.

In example embodiments in which the adhesive bladder and the outer structure of the wing 205 are permeable to air or gases, gases transferred via the transfer lines 630 to expand and cure the wing 205 may be contained within the first closed chamber 640a. In addition, heat transferred via the transfer lines 630 to expand and cure the wing 205 may be also contained within the first closed chamber 640a. However, at least a portion of the heat and/or gases transferred to the wing 205 may be consumed, dissipated, or otherwise used as part of the expansion, bonding, and/or curing processes of components of the wing 205. For example, at least a portion of the heat and/or gases may be used to expand and cure the expanding foam materials, to expand, bond, and/or cure the adhesive bladder, and/or to expand and cure the outer structure.

Then, at least a portion of the heat and/or gases transferred to the wing 205 may remain unconsumed, undissipated, or otherwise unused as part of the expansion, bonding, and/or curing processes of components of the wing 205, and may be contained within the first closed chamber 640a. As shown in FIG. 6, the unused portion of the heat and/or gases from the first closed chamber 640a may be transferred to a second closed chamber 640b via one or more manifolds 626, one or more valves 628, and/or one or more transfer lines 630. Features or aspects of the manifolds, valves, and/or transfer lines may be substantially similar to those described herein with respect to FIG. 5.

As shown in FIG. 6, a second expandable component 605, e.g., an aerial vehicle wing (shown in a substantially compressed configuration), may be placed within the second closed chamber 640b, and one or more transfer lines 630 may be connected to one or more transfer points of the component 605. Heat and/or gases may be transferred via the transfer lines 630 to an interior of an adhesive bladder within the component 605, thereby causing expansion and/or curing of expanding foam materials inside the adhesive bladder, expansion, bonding, and/or curing of the adhesive bladder inside the outer structure, and/or expansion and/or curing of the outer structure.

Although FIG. 6 shows two closed chambers 640a, 640b connected substantially in series to recapture and reuse heat and/or gases to expand and cure expandable components, any other number, arrangement, and/or combination of closed chambers may be connected in various configurations to recapture and reuse heat and/or gases. However, at least a portion of the heat and/or gases transferred to a closed chamber may be consumed, dissipated, or otherwise used as part of the expansion, bonding, and/or curing processes of a component within such closed chamber, such that there may be physical and/or thermodynamic limits associated with the recapture and reuse of heat and/or gases. Moreover, there may be other losses associated with the recapture and reuse of heat and/or gases, including but not limited to heat transferred to materials of closed chambers, manifolds, valves, and/or transfer lines, as well as gas losses at various interfaces between closed chambers, manifolds, valves, and/or transfer lines.

Figure 7:
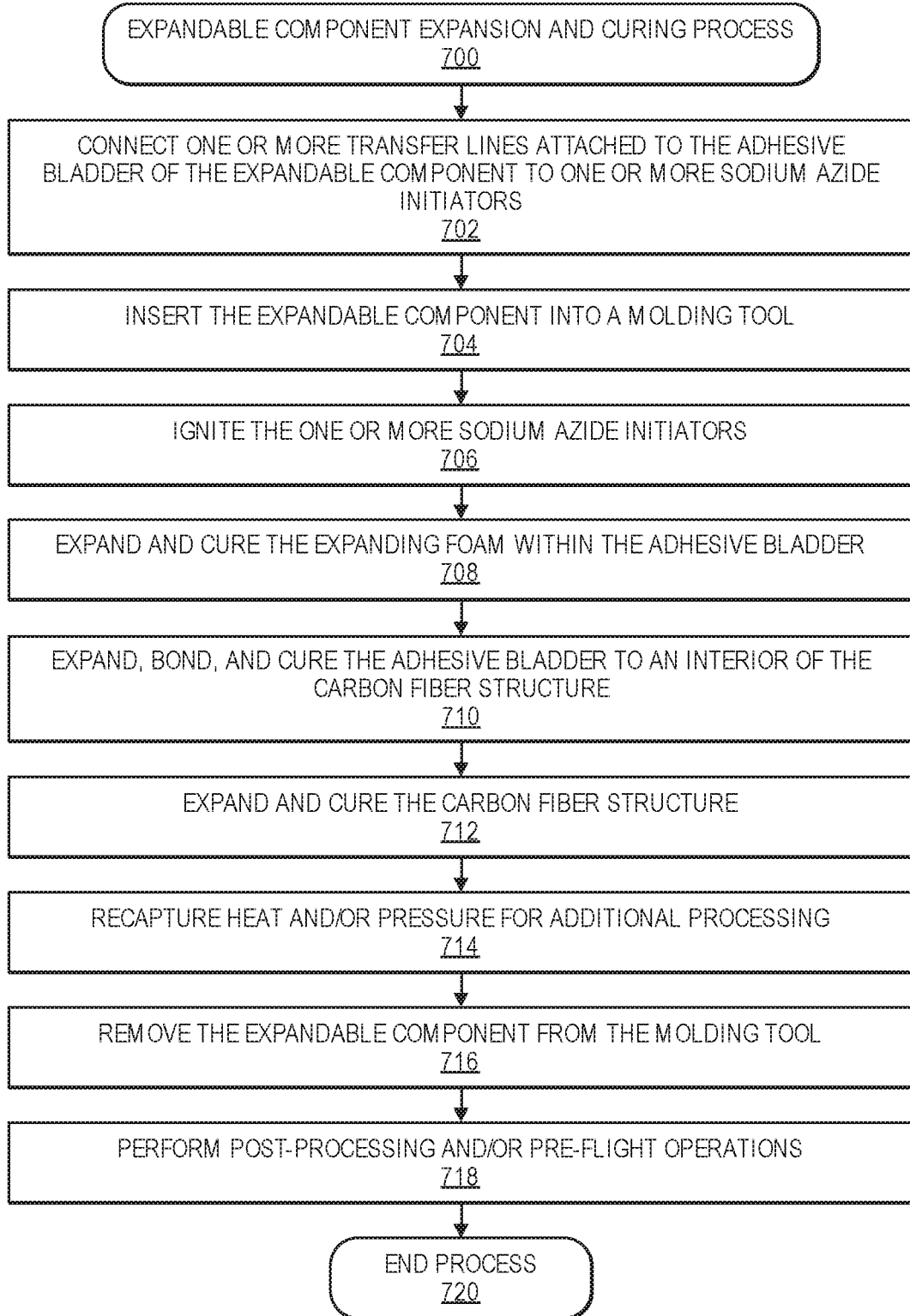
FIG. 7 is a flow diagram illustrating an example expandable component expansion and curing process, according to an implementation.

FIG. 7 is a flow diagram illustrating an example expandable component expansion and curing process 700, according to an implementation.

The process 700 may begin by connecting one or more transfer lines attached to the adhesive bladder of the expandable component to one or more sodium azide initiators, as at 702. The transfer lines may have been previously attached or connected to transfer points of the adhesive bladder. Alternatively, the transfer lines may be attached or connected to transfer points of the adhesive bladder as part of this step. In example embodiments, the sodium azide initiators, or other heat and/or pressure sources, may be directly connected to the transfer lines. In other example embodiments, the sodium azide initiators may be connected to the transfer lines via one or more manifolds and/or valves. In still further example embodiments, the sodium azide initiators may be preformed integrally within or located inside the adhesive bladder without the need for any transfer lines, such that they are encased within the expandable component.

The process 700 may continue by inserting the expandable component into a molding tool, as at 704. In example embodiments, the expandable component may be designed and/or configured to expand to a desired shape or size, such that this step may be omitted. In other example embodiments, the molding tool may be formed with interior surfaces corresponding to the desired shape or size of the expandable component. In addition, the molding tool may apply heat and/or pressure to the expandable component to facilitate expansion and/or curing of the outer structure, the adhesive bladder, and/or the expanding foam materials therein. In further example embodiments, the expandable component may be placed within a molding tool after the expandable component has at least partially expanded. For example, the expandable component may unroll, unfold, and/or expand at least partially to the desired shape or size, and the expandable component may be placed within the molding tool in such a partially expanded configuration.

The process 700 may then proceed to ignite the one or more sodium azide initiators, as at 706. The sodium azide initiators, or other heat and/or pressure sources, may be activated by a controller to release heat and/or gases to expanding foam materials inside an adhesive bladder within an expandable component. For example, the controller may actuate an igniter to actuate the sodium azide initiators. In addition, the controller may cause activation of a plurality of sodium azide initiators, or other heat and/or pressure sources, according to a sequence or order associated with expansion and/or curing of sections or portions of an expandable component. Further, the controller may actuate or control operation of other components, such as manifolds and/or valves, to control the transfer of heat and/or gases to expanding foam materials inside an adhesive bladder within an expandable component or sections thereof.

The process 700 may then continue to expand and cure the expanding foam materials within the adhesive bladder, as at 708. For example, the expanding foam materials may be one-part, two-part, or other multi-part expanding foam materials. In addition, the expanding foam materials may be configured to expand and/or cure upon application of heat and/or pressure. A defined amount of expanding foam materials may be injected or placed within the adhesive bladder to cause expansion of the adhesive bladder and/or outer structure to a desired shape or size, e.g., by applying a desired amount of overpressure within the adhesive bladder.

The process 700 may then continue to expand, bond, and cure the adhesive bladder to an interior of the outer structure, such as a carbon fiber structure, as at 710. For example, the adhesive bladder may expand to a desired shape or size responsive to expansion of the foam materials contained therein upon application of heat and/or pressure. In addition, the adhesive bladder may become relatively more sticky or tacky upon application of heat, such that the adhesive bladder may at least partially bond to an interior of the outer structure. Further, the adhesive bladder may cure in its bonded configuration with the outer structure upon further application of heat and/or pressure.

The process 700 may then continue to expand and cure the outer structure, such as a carbon fiber structure, as at 712. For example, the outer structure may expand to a desired shape or size responsive to expansion of the adhesive bladder and the foam materials contained therein upon application of heat and/or pressure. In addition, in example embodiments in which the outer structure is a resin pre-impregnated carbon fiber structure, the outer structure may cure in the desired shape or size upon application of heat and/or pressure.

The process 700 may then proceed to recapture heat and/or pressure for additional processing, as at 714. For example, as described herein with respect to FIG. 6, at least a portion of heat and/or gases used to expand, bond, and/or cure an expandable component may be contained within a closed chamber. Then, the contained portion of heat and/or gases may be recaptured and reused in another closed chamber to expand, bond, and/or cure another expandable component. In example embodiments, a plurality of closed chambers may be connected in various configurations to recapture and reuse heat and/or gases, subject to physical and/or thermodynamic limits as well as losses associated with components of the manufacturing systems.

The process 700 may then continue by removing the expandable component from the molding tool, as at 716. In example embodiments, the expandable component may be designed and/or configured to expand to a desired shape or size, such that this step, like step 704, may be omitted. In other example embodiments, the molding tool may be formed with interior surfaces corresponding to the desired shape or size of the expandable component. In addition, the molding tool may apply heat and/or pressure to the expandable component to facilitate expansion and/or curing of the outer structure, the adhesive bladder, and/or the expanding foam materials therein.

The process 700 may then proceed to perform post-processing and/or pre-flight operations, as at 718. For example, post-processing may include various cutting, grinding, polishing, treatment, or any other mechanical, chemical, or other processes associated with the expandable component. In addition, post-processing may include removing the expanding foam materials from within the adhesive bladder and outer structure, such that the outer structure may be substantially hollow. Further, post-processing may include various testing processes, such as structural, validation, reliability, or other testing. Moreover, post-processing may include attaching, adhering, inserting, or otherwise connecting one or more other components to the expandable component. In example embodiments in which the expandable component is an aerial vehicle component, the post-processing may include various pre-flight operations, including connecting one or more components to the aerial vehicle component, testing one or more components, flight testing the aerial vehicle component and connected components, or various other processing. The process 700 may then end, as at 720.

Figure 8:
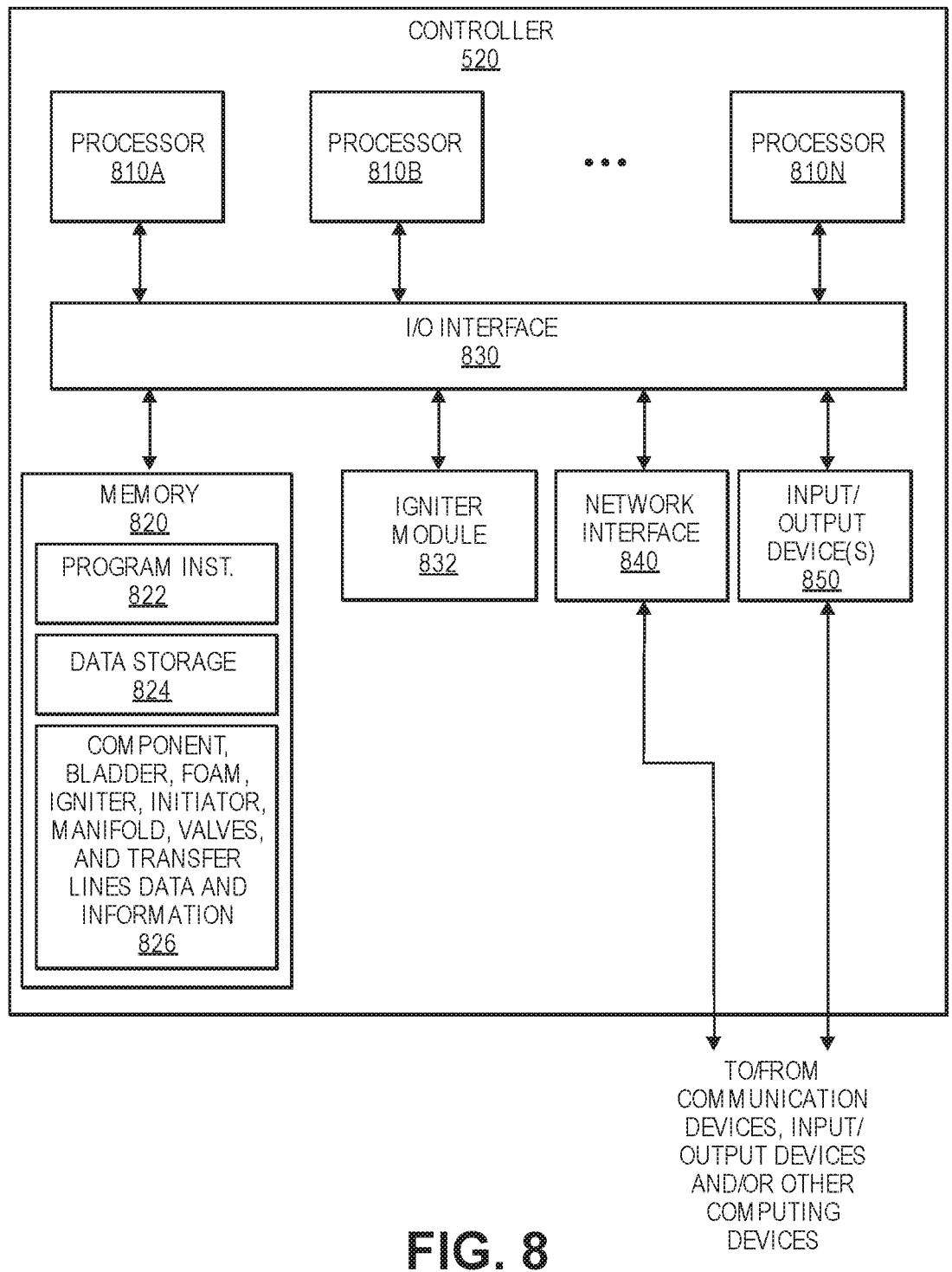
FIG. 8 is a block diagram illustrating various components of an example controller of an expandable component manufacturing system, according to an implementation.

FIG. 8 is a block diagram illustrating various components of an example controller 520 of an expandable component manufacturing system, according to an implementation. In various examples, the block diagram may be illustrative of one or more aspects of the example controller 520 that may be used to implement the various systems and processes discussed above. In the illustrated implementation, the example controller 520 includes one or more processors 810, coupled to a non-transitory computer readable storage medium 820 via an input/output (I/O) interface 830. The example controller 520 may also include an igniter module 832, a network interface 840, and one or more input/output devices 850.

The example controller 520 may be included as part of a computing device or system, a manufacturing device or system, other input/output devices or systems, and/or other computing systems, or combinations thereof. In various implementations, the example controller 520 may be a uniprocessor system including one processor 810, or a multiprocessor system including several processors 810A-810N (e.g., two, four, eight, or another suitable number). The processor(s) 810 may be any suitable processor capable of executing instructions. For example, in various implementations, the processor(s) 810 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 810 may commonly, but not necessarily, implement the same ISA.

The non-transitory computer readable storage medium 820 may be configured to store executable instructions 822, data 824, and expandable component, adhesive bladder, expanding foam material, igniter, sodium azide initiator (or other heat and/or pressure source), manifold, valve, and/or transfer line data, information, and/or characteristics 826, and/or other data items accessible by the processor(s) 810. In various implementations, the non-transitory computer readable storage medium 820 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable storage medium 820 as program instructions 822, data storage 824 and other information and data 826, respectively. In other implementations, program instructions, data and/or other information and data may be received, sent or stored upon different types of computer-accessible media, such as non-transitory media, or on similar media separate from the non-transitory computer readable storage medium 820 or the example controller 520.

Generally speaking, a non-transitory, computer readable storage medium may include storage media or memory media such as magnetic or optical media, e.g., disk or CD/DVD-ROM, coupled to the example controller 520 via the I/O interface 830. Program instructions and data stored via a non-transitory computer readable medium may be transmitted by transmission media or signals, such as electrical, electromagnetic, or digital signals, which may be conveyed via a communication medium such as a network and/or a wireless link, such as may be implemented via the network interface 840.

In one implementation, the I/O interface 830 may be configured to coordinate I/O traffic between the processor(s) 810, the non-transitory computer readable storage medium 820, and any peripheral devices, the network interface 840 or other peripheral interfaces, such as input/output devices 850. In some implementations, the I/O interface 830 may perform any necessary protocol, timing or other data transformations to convert data signals from one component (e.g., non-transitory computer readable storage medium 820) into a format suitable for use by another component (e.g., processor(s) 810). In some implementations, the I/O interface 830 may include support for devices attached through various types of peripheral buses, such as a variant of the Peripheral Component Interconnect (PCI) bus standard or the Universal Serial Bus (USB) standard, for example. In some implementations, the function of the I/O interface 830 may be split into two or more separate components, such as a north bridge and a south bridge, for example. Also, in some implementations, some or all of the functionality of the I/O interface 830, such as an interface to the non-transitory computer readable storage medium 820, may be incorporated directly into the processor(s) 810.

The igniter module 832 may be in communication with the igniter and/or the sodium azide initiators (or other heat and/or pressure sources). For example, the igniter module 832 may instruct, actuate, or otherwise cause the sodium azide initiators to release heat and/or gases that may be transferred to expanding foam materials inside an adhesive bladder of an expandable component. The igniter module 832 may actuate or cause release of heat and/or gases via electrical, mechanical, chemical, or other means, or combinations thereof. The heat and/or gases may be transferred directly to the expandable component, or via various components as described herein.

The network interface 840 may be configured to allow data to be exchanged between the example controller 520, other devices attached to a network, such as other computer devices or systems, other manufacturing devices or systems, other input/output elements, and/or other computing resources. For example, the network interface 840 may enable wireless communication between the example controller 520 and one or more manufacturing, fabrication, material handling, logistics, or other devices. In various implementations, the network interface 840 may support communication via wireless general data networks, such as a Wi-Fi network. For example, the network interface 840 may support communication via telecommunications networks such as cellular communication networks, satellite networks, and the like.

Input/output devices 850 may, in some implementations, include one or more visual output devices, audio input/output devices, input devices such as touchscreens, keyboards, mice, or other controllers, image capture devices, temperature sensors, pressure sensors, or other sensors. Multiple input/output devices 850 may be present and controlled by the example controller 520.

As shown in FIG. 8, the memory may include program instructions 822 which may be configured to implement the example processes and/or sub-processes described above.

The data storage 824 and other information and data 826 may include various data stores for maintaining data items that may be provided for fabricating, storing, transporting, and/or handling expandable components, expanding, bonding, curing, and/or post-processing expandable components, and any other functions, operations, or processes described herein.

In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Each process described herein may be implemented by the architectures described herein or by other architectures. The processes are illustrated as a collection of blocks in a logical flow. Some of the blocks represent operations that can be implemented in hardware, software, or a combination thereof. In the context of software, the blocks represent computer-executable instructions stored on one or more computer readable media that, when executed by one or more processors, perform the recited operations. Generally, computer-executable instructions include routines, programs, objects, components, data structures, and the like that perform particular functions or implement particular abstract data types.

The computer readable media may include non-transitory computer readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations, the computer readable media may include a transitory computer readable signal (in compressed or uncompressed form). Examples of computer readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the processes. Additionally, one or more of the operations may be considered optional and/or not utilized with other operations.

Those skilled in the art will appreciate that the example controller 520 is merely illustrative and is not intended to limit the scope of the present disclosure. In particular, the controller may include any combination of hardware or software that can perform the indicated functions, including computers, network devices, internet appliances, PDAs, wireless phones, pagers, etc. The example controller 520 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the example controller 520. Some or all of the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from the example controller 520 may be transmitted to the example controller 520 via transmission media or signals, such as electrical, electromagnetic, or digital signals, conveyed via a communication medium, such as a network and/or a wireless link. Various implementations may further include receiving, sending or storing instructions and/or data implemented in accordance with the foregoing description upon a computer-accessible medium. Accordingly, the techniques described herein may be practiced with other example controller configurations.

Those skilled in the art will appreciate that, in some implementations, the functionality provided by the processes and systems discussed above may be provided in alternative ways, such as being split among more software modules or routines or consolidated into fewer modules or routines. Similarly, in some implementations, illustrated processes and systems may provide more or less functionality than is described, such as when other illustrated processes instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that, in other implementations, the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some implementations, illustrated data structures may store more or less information than is described, such as when other illustrated data structures instead lack or include such information respectively, or when the amount or types of information that is stored is altered. The various processes and systems as illustrated in the figures and described herein represent example implementations. The processes and systems may be implemented in software, hardware, or a combination thereof in other implementations. Similarly, the order of any process may be changed, and various elements may be added, reordered, combined, omitted, modified, etc., in other implementations.

From the foregoing, it will be appreciated that, although specific implementations have been described herein for purposes of illustration, various modifications may be made without deviating from the spirit and scope of the appended claims and the features recited therein. In addition, while certain aspects are presented below in certain claim forms, the inventors contemplate the various aspects in any available claim form. For example, while only some aspects may currently be recited as being embodied in a computer readable storage medium, other aspects may likewise be so embodied. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A manufacturing system for an expandable component, comprising:
a controller;
an igniter;
at least one sodium azide initiator;
at least one manifold connected to the at least one sodium azide initiator and comprising at least one valve; and
at least one transfer line configured to connect the at least one manifold to at least one transfer point of an expandable component, the expandable component comprising a carbon fiber structure, an adhesive bladder disposed within the carbon fiber structure, and an expanding foam disposed within the adhesive bladder;
wherein the controller is configured to at least:
activate the igniter to initiate the at least one sodium azide initiator; and
control the at least one valve of the at least one manifold to direct at least one of heat or pressure generated by the at least one sodium azide initiator to the at least one transfer point of the expandable component via the at least one transfer line;
wherein the expandable component expands and cures responsive to application of the at least one of heat or pressure.

2. The manufacturing system of claim 1, further comprising:
a closed chamber within which the expandable component is connected to the at least one transfer line;
wherein at least a portion of the at least one of heat or pressure directed to the expandable component via the at least one transfer line is maintained within the closed chamber.

3. The manufacturing system of claim 2, further comprising:
at least one second manifold connected to the closed chamber and comprising at least one second valve; and
at least one second transfer line configured to connect the at least one second manifold to at least one second transfer point of a second expandable component, the second expandable component comprising a second carbon fiber structure, a second adhesive bladder disposed within the second carbon fiber structure, and a second expanding foam disposed within the second adhesive bladder;
wherein the controller is configured to at least:
control the at least one second valve of the at least one second manifold to direct the at least a portion of the at least one of heat or pressure maintained within the closed chamber to the at least one second transfer point of the second expandable component via the at least one second transfer line;
wherein the second expandable component expands and cures responsive to application of the at least a portion of the at least one of heat or pressure.

4. The manufacturing system of claim 3, further comprising:
a second closed chamber within which the second expandable component is connected to the at least one second transfer line;
wherein at least a portion of the at least a portion of the at least one of heat or pressure directed to the second expandable component via the at least one second transfer line is maintained within the second closed chamber.

5. A manufacturing system, comprising:
a controller;
a source of at least one of heat or pressure; and
at least one transfer line configured to connect the source to at least one transfer point of an expandable component, the expandable component comprising an outer structure, an adhesive bladder disposed within the outer structure, and an expanding foam disposed within the adhesive bladder;
wherein the controller is configured to at least:
direct the at least one of heat or pressure from the source to the at least one transfer point of the expandable component via the at least one transfer line;
wherein the expandable component expands and cures responsive to application of the at least one of heat or pressure.

6. The manufacturing system of claim 5, wherein the source comprises:
an igniter; and
a sodium azide initiator;
wherein the controller is further configured to at least:
activate the igniter to initiate the sodium azide initiator to generate the at least one of heat or pressure.

7. The manufacturing system of claim 5, further comprising:
a manifold connected to the source and comprising at least one valve;
wherein the controller is further configured to at least:
control the at least one valve of the manifold to direct the at least one of heat or pressure from the source to the at least one transfer point of the expandable component via the at least one transfer line.

8. The manufacturing system of claim 5, further comprising:
a plurality of transfer lines configured to connect the source to a plurality of transfer points of the expandable component.

9. The manufacturing system of claim 8, wherein the controller is further configured to at least:
control a respective plurality of valves associated with the plurality of transfer lines to control a timing of connection between the source and the plurality of transfer points of the expandable component.

10. The manufacturing system of claim 5, further comprising:
a plurality of sources configured to be connected to a plurality of expandable components via a plurality of transfer lines.

11. The manufacturing system of claim 10, wherein the controller is further configured to at least:
control a timing of activation of the plurality of sources to direct the at least one of heat or pressure from the plurality of sources to the plurality of expandable components.

12. The manufacturing system of claim 5, further comprising:
a molding tool within which the expandable component expands and cures responsive to application of the at least one of heat or pressure.

13. The manufacturing system of claim 5, further comprising:
a closed chamber within which the expandable component is connected to the at least one transfer line;

wherein at least a portion of the at least one of heat or pressure directed to the expandable component via the at least one transfer line is maintained within the closed chamber.

14. The manufacturing system of claim 13, further comprising:
at least one second transfer line configured to connect the closed chamber to at least one second transfer point of a second expandable component, the second expandable component comprising a second outer structure, a second adhesive bladder disposed within the second outer structure, and a second expanding foam disposed within the second adhesive bladder;
wherein the controller is configured to at least:
direct the at least a portion of the at least one of heat or pressure from the closed chamber to the at least one second transfer point of the second expandable component via the at least one second transfer line;
wherein the second expandable component expands and cures responsive to application of the at least a portion of the at least one of heat or pressure.

15. The manufacturing system of claim 5, wherein the expandable component comprises at least one of a frame, a fuselage, a wing, a control surface, a motor arm, a panel, a beam, or a tube.

* * * * *